(12) United States Patent
Oberle et al.

(10) Patent No.: US 7,847,449 B2
(45) Date of Patent: Dec. 7, 2010

(54) MODULAR ELECTRIC MOTOR DRIVE UNIT

(75) Inventors: Hans-Juergen Oberle, Rastatt (DE); Franz Schwendemann, Ottersweier (DE); Dieter Scheer, Buehlertal (DE); Uwe Merkelbach, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 507 days.

(21) Appl. No.: 11/579,517

(22) PCT Filed: Apr. 28, 2005

(86) PCT No.: PCT/EP2005/051936

§ 371 (c)(1),
(2), (4) Date: Nov. 3, 2006

(87) PCT Pub. No.: WO2005/109607

PCT Pub. Date: Nov. 17, 2005

(65) Prior Publication Data

US 2007/0267923 A1 Nov. 22, 2007

(30) Foreign Application Priority Data

May 3, 2004 (DE) .................. 10 2004 021 537

(51) Int. Cl.
*H02K 5/00* (2006.01)
*H02K 5/04* (2006.01)
*H02K 5/16* (2006.01)
*H02K 5/26* (2006.01)
*H02K 7/16* (2006.01)
*H02K 7/116* (2006.01)

(52) U.S. Cl. .................. 310/89; 310/75 R; 310/83; 310/90; 310/91; 310/98; 310/99; 310/154.08; 310/40 MM

(58) Field of Classification Search .................. 310/42, 310/51, 85, 89, 91, 75 R, 83, 90, 98, 99, 154.08; 174/50, 520; 74/425; *H02K 5/00, 5/04, H02K 5/16, 5/26, 7/14, 7/116; F04B 17/04, F04B 53/22; F16H 1/16, 7/02*
See application file for complete search history.

(56) References Cited

U.S. PATENT DOCUMENTS

| 5,117,138 | A | * | 5/1992 | Trian | ........................... 310/89 |
| 5,792,573 | A | | 8/1998 | Pitzen et al. | |
| 5,803,427 | A | | 9/1998 | Huang | |
| 6,288,464 | B1 | * | 9/2001 | Torii et al. | ..................... 310/78 |
| 6,539,281 | B2 | | 3/2003 | Wan et al. | |

(Continued)

FOREIGN PATENT DOCUMENTS

DE 417980 8/1925

(Continued)

*Primary Examiner*—Quyen Leung
*Assistant Examiner*—Michael Andrews
(74) *Attorney, Agent, or Firm*—Merchant & Gould P.C.

(57) ABSTRACT

An electromotor for regulating a drive in a motor vehicle. The electromotor includes an armature spindle mounted in a pole housing that includes a shell. At least on one front side of the shell a bearing cover is coupled thereon to accommodate an armature spindle bearing. The electromotor also includes a radial molding formed on the pole housing that receives a guide track of a gear assembly housing via radial insertion to fasten the electromotor to the gear assembly housing without the use of additional fasteners.

13 Claims, 4 Drawing Sheets

U.S. PATENT DOCUMENTS

Figure 1:
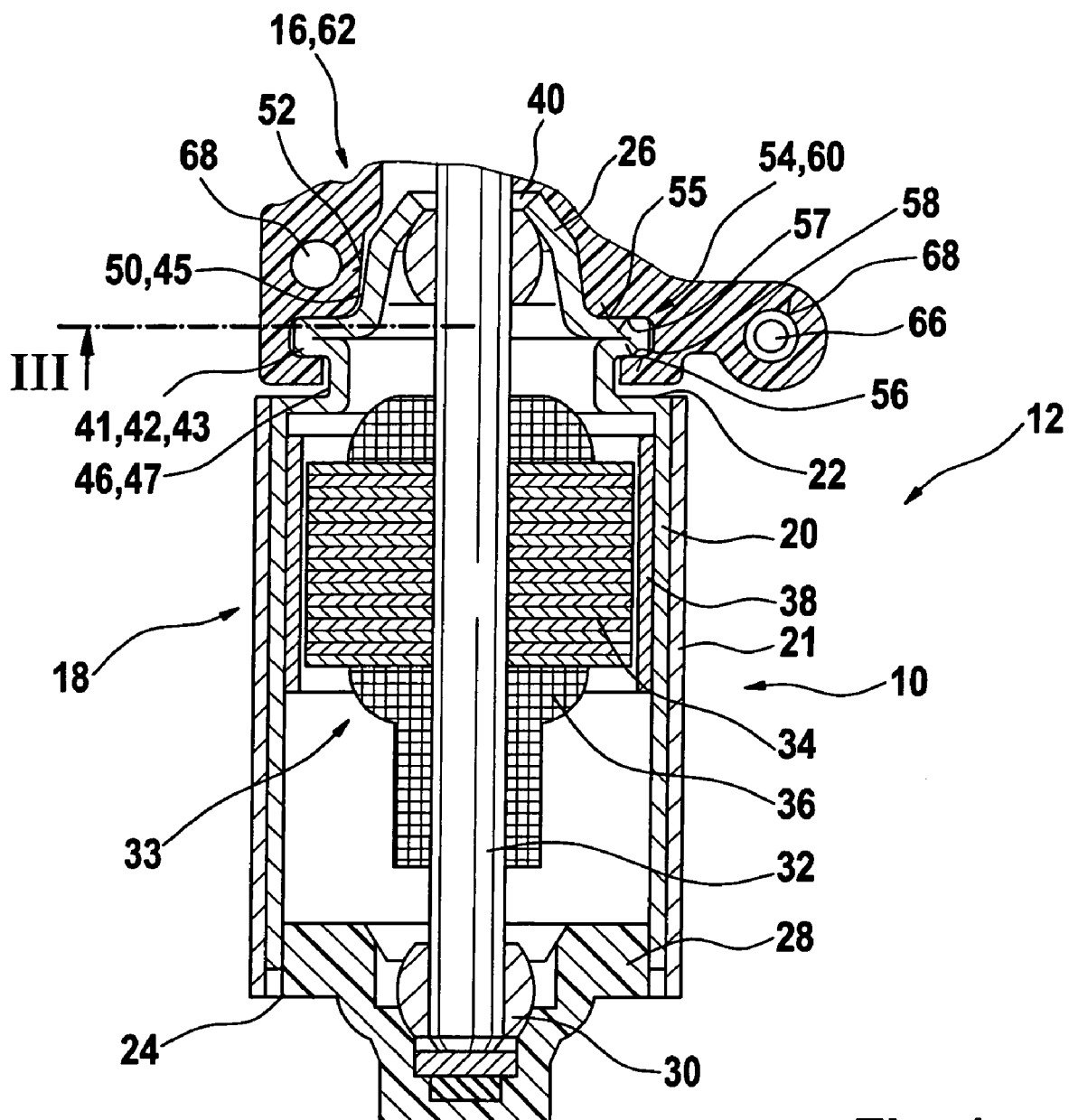

| | | |
|---|---|---|
| 6,639,335 B1 * 10/2003 | Lauk et al. | 310/89 |
| 6,713,913 B1 * 3/2004 | Hager et al. | 310/89 |
| 6,861,954 B2 3/2005 | Levin | |
| 6,897,580 B2 * 5/2005 | White | 310/51 |
| 2001/0043021 A1 11/2001 | Laoun | |
| 2003/0144926 A1 7/2003 | Bodin et al. | |
| 2008/0197733 A1 * 8/2008 | Oberle et al. | 310/89 |

FOREIGN PATENT DOCUMENTS

| | | |
|---|---|---|
| DE | 861944 | 1/1953 |
| DE | 30 36 865 A1 | 9/1980 |
| DE | 30 36 865 A1 | 4/1982 |
| DE | 861944 | 1/1985 |
| DE | 40 38 551 C1 | 6/1992 |
| DE | 195 39 017 A1 | 4/1997 |
| DE | 196 15 053 A1 | 10/1997 |
| DE | 100 19 512 A1 | 8/2001 |
| JP | 9107665 | 4/1997 |
| JP | 2002542106 | 12/2002 |
| JP | 2003500997 | 1/2003 |
| JP | 2003189542 | 7/2003 |
| WO | 00/63515 | 10/2000 |

* cited by examiner

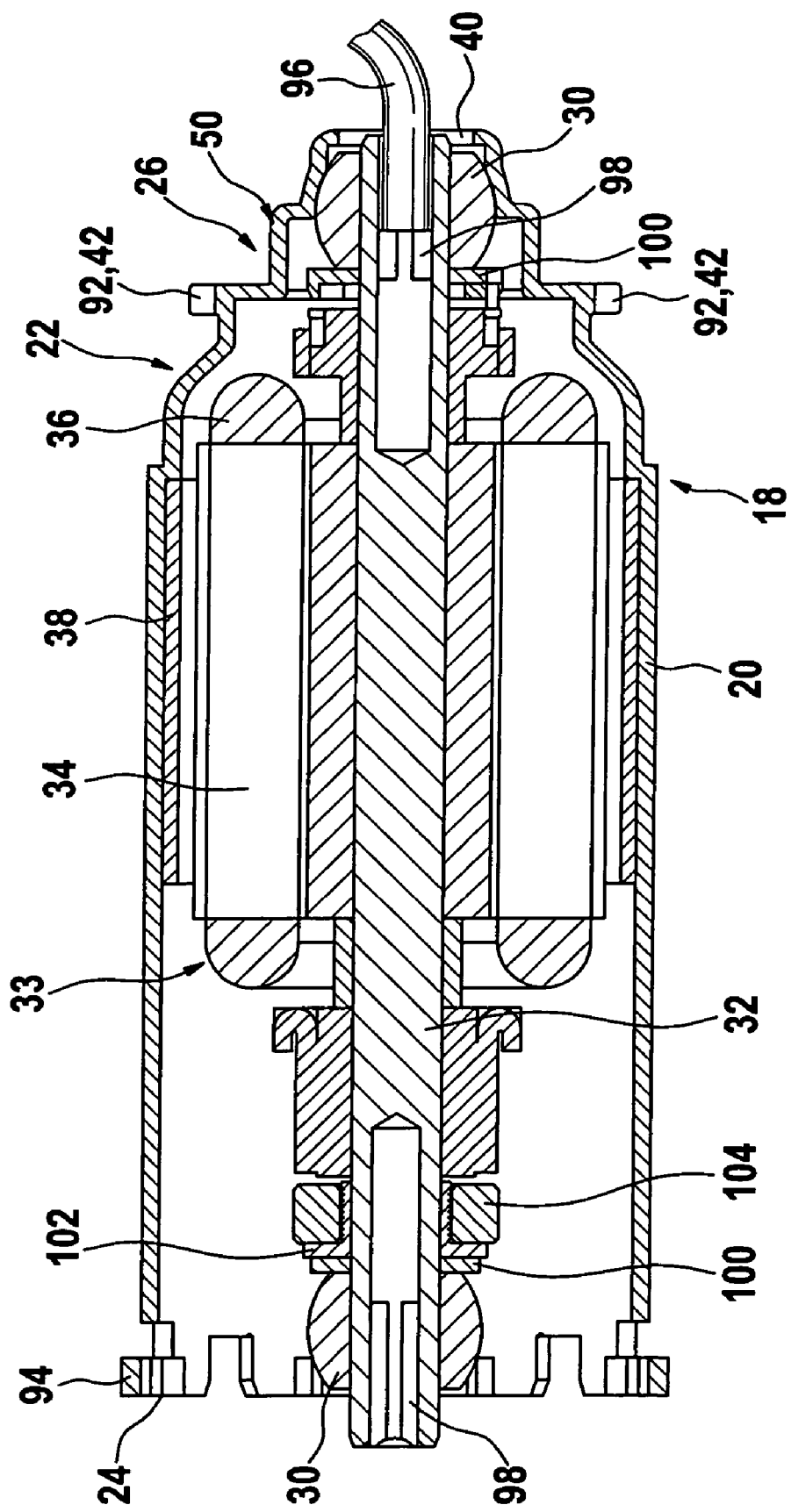

MODULAR ELECTRIC MOTOR DRIVE UNIT

FIELD OF THE INVENTION

The invention concerns itself with an electromotor and a gear assembly drive unit for use in regulating (positioning) devices in the motor vehicle according to the class of the independent claims.

BACKGROUND

From German patent DE 100 19 512 A1 a window lift drive was made known whose housing consists of a pole pot and the housing which closes it off. The housing which closes the pole pot is in this instance a gear assembly housing with an integrated electronic housing. In so doing a separate component is arranged as a brush holder between the pole pot and the housing. This component also serves simultaneously as a gasket between the two parts of the overall housing. The pole pot consists of a deep drawn flattened cylindrical pipe, on whose open end a flange has been molded. Holes have been recessed in the pole pot flange to accept screws. In the flange of the gear system housing threads have been internally formed in which screws are turned for the purpose of holding the two housing parts securely together. In the flange of the pole pot more receptacles are formed than are needed for a connection with the gear assembly housing. Such a pole pot then allows itself to be connected to different gear system housings with various types of counter receptacles; however, the electromotor must thereby always be mounted and fastened axially in the gear system housing. For this reason the open electromotor being discussed is not designed for use without a gear assembly housing.

SUMMARY

The electromotor according to the invention and the gear assembly drive unit according to the invention have the advantage, in that due to the insertion of the radial molding of the electromotor into a guide track of the gear assembly housing, the electromotor together with other gear system components can be radially mounted. When sealing the gear assembly housing the electromotor will thereby be reliably fixed on the gear assembly housing without necessitating the additional use of attaching devices for the electromotor. Furthermore, the bearing cover seals off the pole housing reliably, so that the electromotor can be used universally. This includes without being used in combination with a gear system housing. By means of the design of the gear assembly housing as radially interfacing housing parts, non-sliding spray tools can be used in their manufacture which can significantly reduce the cost of the equipment. The radial molding forms a compact and rigid connecting interface between the electromotor and any desired housing parts and, therefore, suits itself especially well as a standard basic motor. The radial molding allows for a standard-unit compatible production of the electromotor to be combined with customer specific interfaces as well as with various gear assembly housings and specialized attachment flanges. Moreover, such a system eases the disassembly of such a drive unit for the purpose of repair or recycling.

By means of the characteristics detailed in the sub-claims, advantageous modifications of the device are possible. Depending upon the production method of the pole housing, the radial molding can be formed at one end on the cylinder's shell as well as at the bearing cover of the shell. For example, in the case that separate stamped parts are used for the shell and the bearing cover, the radial moldings can be very advantageously designed and if applicable bent as stamped parts before assembly of the pole housing.

If the pole cylinder is manufactured using a deep drawing process, the bearing cover can simply be formed as one piece to the front side of the shell. Thereby a pole pot which is closed on one side can be manufactured in one step. In so doing, an opening for the armature spindle, which protrudes out of the pole pot must be created by removing material. By designing the bearing cover and the shell of the pole housing as one piece, the cup and ball bearing and consequently with it the armature spindle can be arranged very exactly in the middle of the pole pot. This would in turn allow for the assembly tolerances between the armature and the permanent magnets to be reduced.

By assembly of both bearing covers on the pole housing, the electromotor can be used as an independent structural unit without a gear assembly. An efficient interface for the power displacement is created by the opening in the bearing cover. The armature spindle protrudes thereby through the opening and out of the cylinder in order to drive a regulating device by means of its output link. As an alternative a drive shaft of the regulating device initiates a power linkage that is positively locked with the armature spindle through the opening. The armature spindle in this case would not protrude out of the pole housing.

It is particularly optimal to design the radial molding as a circularly rotating collar, while therefore the electromotor would be held securely in the corresponding guide in all radial directions. The radial extent of travel of the radial molding can thereby be held relatively small.

Such a radial molding can very easily be produced by a deep drawing process, in which a certain wall segment is set (through a setting process), respectively seamed, until the inside surfaces of the wall segment rest axially against each other. Such a double walled embodiment of the radial molding can absorb high forces, out of which a very tight and rigid connection results between the electromotor and the gear assembly housing.

If the outer diameter of the radial molding is less than the outer diameter of the remaining, for the most part cylindrically shaped pole housing, so can the diameter of the corresponding guide tracks be constructed smaller; so that the outside diameter of the gear assembly housing does not extend beyond the diameter of the pole cylinder at the point of connection. In this manner the structural space of the gear assembly housing can be reduced in the area of connection.

In order to secure the electromotor against twisting in the gear assembly housing or in the attachment flange, recesses are cut into the radial molding in which material of the gear assembly housing, respectively the attachment flange, can mesh. Thereby the additional use of fasteners, such as screws or rivets, can be avoided.

If the radial moldings are designed as radial bridges lying opposed to each other, which mesh in their respective lateral guide tracks. The structural height of the drive unit in the other radial direction can be reduced. The bridges can be especially advantageously designed as stamped parts.

If high noise demands are placed on the electromotor, a second pole casing can be placed around the pole housing shell. This greatly reduces the motor's noise. In so doing, micro-friction induces an energy transformation from oscillatory to friction energy.

For the purpose of absolutely fixing the position of the electromotor juxtaposed to the gear assembly housing and the attachment flange, a centering peg has been formed to the bearing cover, which radially centers the electromotor when it meshes with a corresponding counter formation. Thereby the area of the bearing cover, which for example houses within a cup and ball bearing, a roller bearing or a bearing hold-down spring, can be cylindrically formed in the axial direction in order to achieve a centering which is concentric to the armature spindle.

In a further modification of the electromotor additional radial bridges are formed on the pole housing, which serve to attach the electromotor to a reinforcement flange. Thereby a freely constructed, reliable connection to an attachment flange can be created for the use of the electromotor without a gear assembly housing.

In order to reliably fix the electromotor axially within the gear assembly housing, the radial molding lies with its upper and lower axial contact surface on the corresponding guide surfaces of the guide track in the gear assembly housing. The guide track can in such a manner be designed advantageously as a U-profile (U-section) into which the radial molding meshes.

The entire gear assembly drive unit can be advantageously radially mounted in its entirety, in that the electromotor is installed with its centering peg into a corresponding counter receptacle of the gear assembly housing. In so doing, the radial molding will simultaneously be fed into the guide track of the gear assembly housing; whereby the electromotor will also be axially fixed. Furthermore, radial material protrusions within the guide track engage in the recesses of the radial molding, so that the pole housing is secured against twisting. By sealing the gear assembly housing with a radially mounted cover or hemispherical shell, the electromotor is simultaneously secured against a relative movement to the gear assembly housing for a long period of time.

Should any electromotor constructed exactly the same be fastened to any desired attachment flange, the attachment flange would have fasteners, such as clips or caulking plates, which would preferably encompass the radial molding in the axial direction at the area where the recess is located. Thus, a universal basic motor can be fastened in a gear assembly housing as well as in an attachment flange without having to undertake structural changes to the motor.

DRAWINGS

Figure 2:
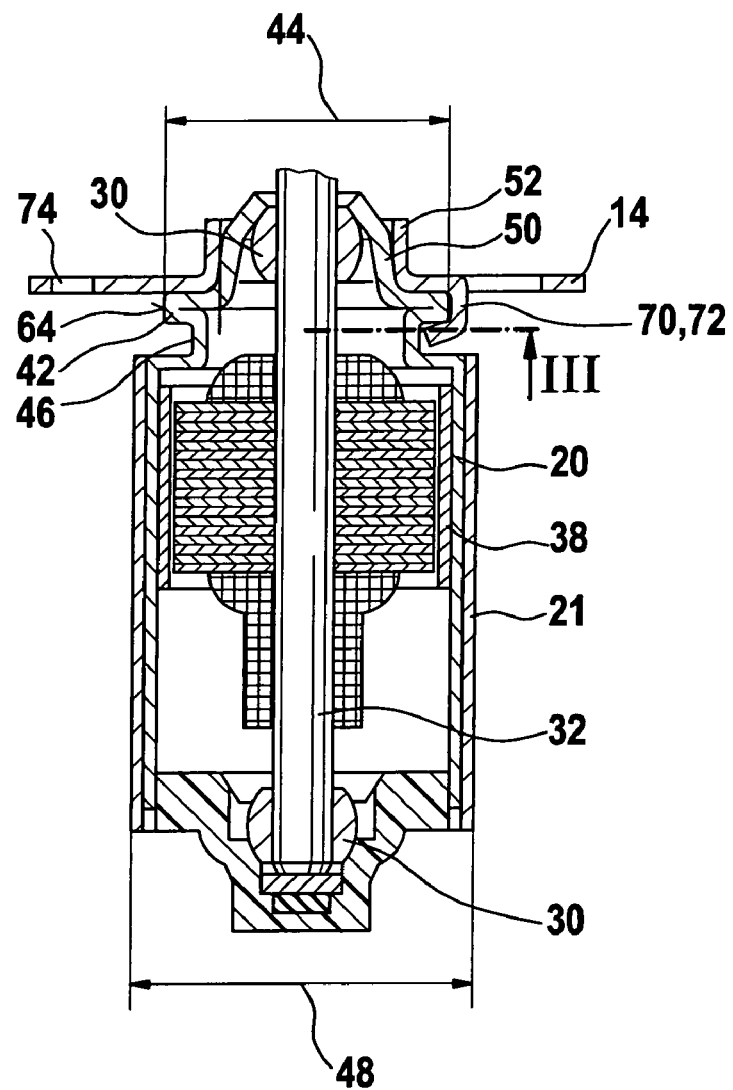
Figure 3:
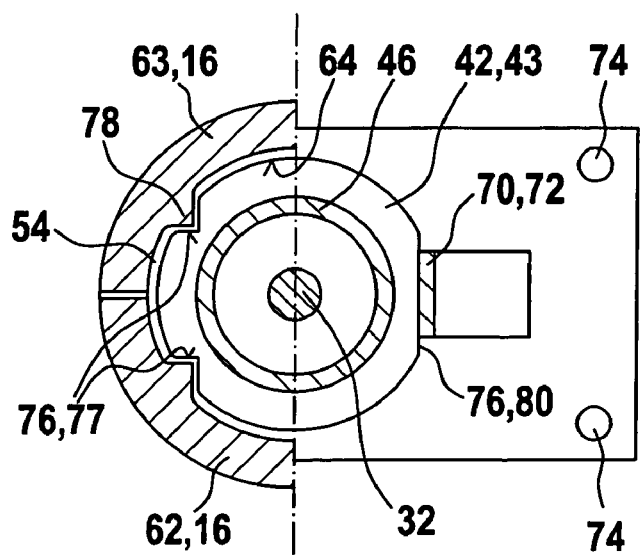
Figure 4:
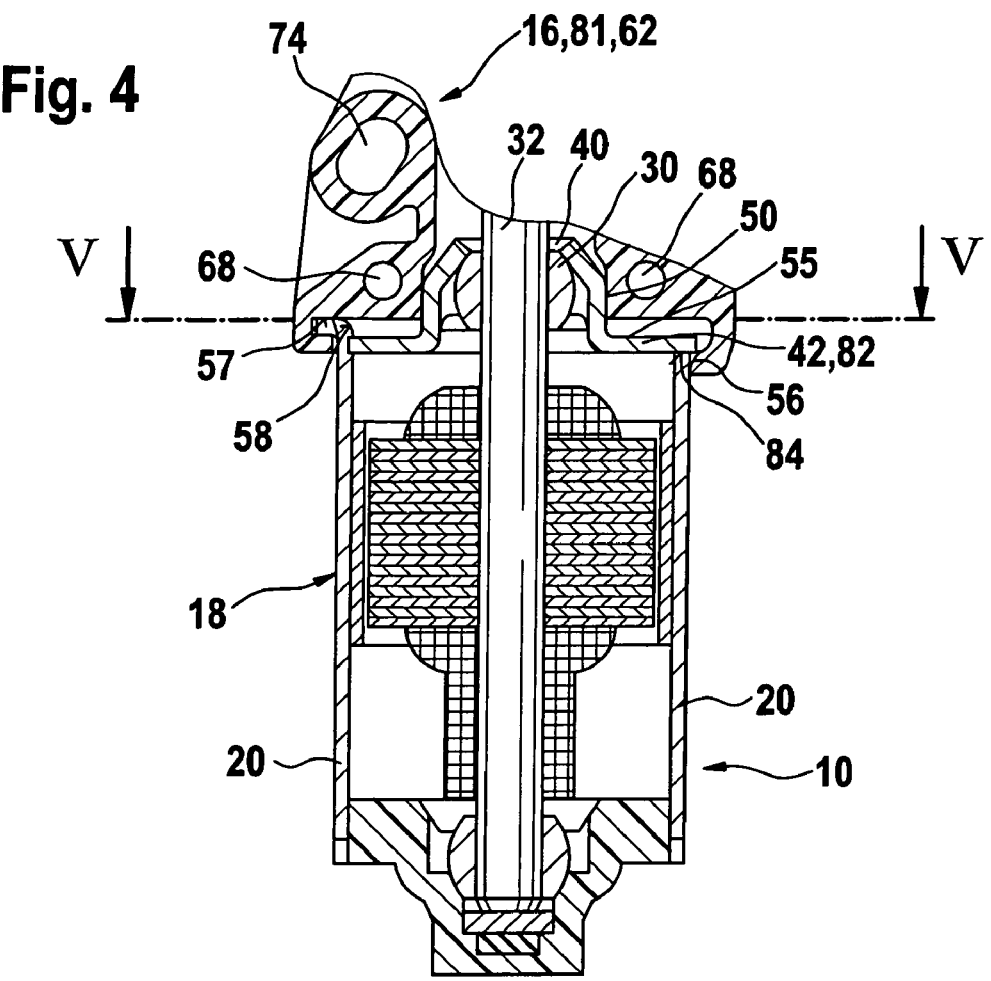
Figure 5:
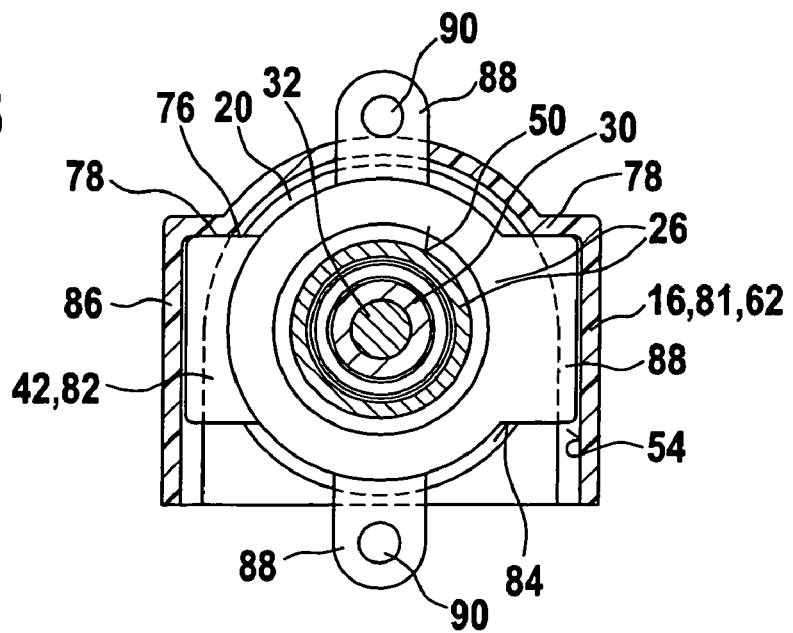

In the drawing embodiment examples of the device according to the invention are depicted, and are more closely explained in the following description. They show:

FIG. 1 a gear assembly drive-unit in section,

FIG. 2 an electromotor mounted in an attachment flange in section,

FIG. 3 a section through the electromotor according to III-III in FIGS. 1 and 2, FIG. 4 a longitudinal section through a modified gear assembly drive-unit;

FIG. 5 a cross section according to V-V in FIG. 4, just as

FIG. 6 a section through a modified example of an embodiment example with a bayonet connection.

DETAILED DESCRIPTION OF THE DRAWINGS

In FIG. 1 a gear assembly drive-unit is depicted in which a separate electromotor 10 is connected to an only partially depicted gear assembly housing. The electromotor 10 has a pole housing 18 with a pole housing shell 20, on whose front sides 22, 24 are bearing covers 26, 28 formed to them. The bearing covers 26, 28 house bearings 30 which in the example of embodiment is displayed as a sliding bearing (friction type) (especially as a cup and ball bearing) in which by means of an armature spindle, the armature is supported. An armature package with coils of wire are arranged on the spindle, which operate together with permanent magnets 38 that are arranged on the shell of the pole housing. The armature spindle 32 penetrates the bearing housing 26 on the front side 22, as a hole 40 has been placed within the cover in the axial direction. The armature spindle protrudes with an unspecified output link into the gear assembly housing 16 in order to provide a drive torque to the moving parts in the motor vehicle over an unspecified gear assembly—such as a worm gear. The pole housing 18 in the example of embodiment is manufactured by a deep drawing process, whereby the shell 20 is designed as one piece with the bearing cover. In so doing, the armature 33 is mounted first into the pole housing 18 and is pushed with the armature spindle 32 through the opening 40, and directly thereafter the bearing cover 28 is installed. For certain applications a second pole housing wall is additionally arranged on the shell 20 in order to reduce the noise created by the electromotor. A radial molding 42 is formed in the area of the bearing cover, which has a larger outer diameter 44 than the areas which directly axially surround it 45, 46. Hence, the outside diameter 44 is ideally less than the outside diameter 48 of the pole housing shell 20. The wall area 46 thus forms a recess 47 or back cut 47 between the radial molding and the shell 20 of the pole housing 18. The area 45 of the bearing cover 26 is designed as a centering peg, which in an assembled state meshes in a corresponding protrusion on the gear assembly housing lying opposite to it. For the attachment of the electromotor 10 to the gear assembly housing 16, the radial molding 42 meshes into the guide track 54 of the gear assembly housing 16, which has guide surfaces lying across from each other 55, 56 upon which the axial molding with its axial contact surfaces 57 and 58 rest. The electromotor is thereby axially tightly fixed in the gear assembly housing. The guide track is designed as a U-profile, which runs in a semi-circle in a first hemispherical shell 62 of the gear assembly housing 16 around the outer edge 64 of the radial molding. After feeding the radial molding into the guide track 54 of the first hemispherical shell 62 and the installation of the gear assembly, which is not depicted, a second hemispherical shell 63 is installed radially to the armature spindle onto the first hemispherical shell 62. The two half shells are then connected to each other by fasteners that engage in their respective receptacles. The radial molding 42 has consequently no receptacles for the fasteners between the electromotor 10 and the gear assembly housing; so that the connection of the two gear assembly housing shells 62 and 63 to each other provides at the same time the sole connection of the electromotor to both of them, which is a reliable one.

In FIG. 2 the same electromotor is exactly depicted; however this example of embodiment is not combined with the gear assembly housing 16 but is assembled on an attachment flange 14. The centering peg 50 thus meshes axially in an opposing protrusion 52 of the attachment flange 14 until the contact surface 57 of the radial molding 42 rests on the attachment flange. For the attachment of the electromotor 10 fasteners 70 encompass the radial molding 42 in the axial direction, so that the second axial contact surface 58 also engages (for example) a caulking plate 72 on the attachment flange 14. The fasteners 70 could alternately be clips or constructed as a compression binding. The radial molding 42 is as in FIG. 1 designed as a rotating collar 43, which when a deep drawing process has been used is designed as one piece with the pole casing 18 as a folded double layered sheet metal 41. The attachment flange 14 has customer specified receptacles, by which the electromotor 10 with the attachment flange 14 can be attached to a motor vehicle part.

FIG. 3 shows a schematic cross-section according to the line III-III, where the left half refers to the embodiment example as in FIG. 1 and the right half refers to the embodiment example as in FIG. 2. The radial molding 42 is constructed as a rotating collar 43. In which case it has in the left half two incisions (cuts) 77 serving as recesses 76 in which material (projections) 78 of both gear assembly housing parts 62 and 63 mesh. Hence the meshing material 78 in the embodiment of FIG. 1 is arranged inside of the guide track between the guide surfaces 55 and 56. By means of this meshing of material 78 between the gear assembly housing 16 and the electromotor 10, a twisting is prevented. In a variation of the radial molding 42 as depicted in the right half of FIG. 3, the recess 76 is designed as lateral flattening 80, which is encompassed by the caulking plate 72 of the attachment flange 14. Such a flattening 80 represents likewise a check against twisting and can be used like the incisions 77 for the attachment flange 14 as well as the gear assembly housing 16.

In FIG. 4 a variation of gear assembly drive-unit according to the invention 12 is depicted, in which the pole housing 18 is not constructed as a deep drawn part but has a rolled and turned shell 20. In this application the bearing cover with the opening 40 for the armature spindle 32 is designed as a separate component part, which is connected on the front side 22 to the shell 20. On the left side of the diagram the radial molding 42 is in this case formed to the shell 20 of the pole housing 18 as one piece, and it is practically bent at a right angle to it. The radial molding 42 does not extend over the entire circumference of the shell 20, but is designed as two opposing bridges 82. These bridges have in turn two axial contact surfaces 57 and 58, which lie on their counterpart contact surfaces 55 and 56 of the guide track 54 of the gear assembly housing 16.

In an alternate embodiment, which is depicted in the right half of the diagram of FIG. 4, the radial molding 42 is directly formed to the bearing cover 26 and protrudes radially over the circumference of the shell 20. The radial molding is once again inserted radially to the armature spindle 32 in lateral guide tracks 54 of a gear assembly housing base plate 81. In so doing, both guide surfaces 55 and 56 are arranged radially displaced. The centering peg 50 is likewise radially inserted into the corresponding counter protrusion 52 of the gear assembly housing base plate 81. The housing will thereafter be sealed with an unspecified (non-depicted) cover. The gear assembly housing base plate 81 has receptacles 68 for the fasteners 66 which insure that the electromotor 10 remains axially and radially secure in its position in the gear assembly housing 16. Furthermore the gear assembly housing 16 has receptacles 74 in order to attach the gear assembly drive-unit 12 to the motor vehicle.

FIG. 5 shows a cross-section corresponding to V-V in FIG. 4, in which the radial bridges 82, lying in opposition (across from) each other and which are formed to the shell 20 or the bearing cover 26, engage in the guide track 54 of the gear assembly housing 16. In this embodiment the guide tracks 54 extend only over the side wall 86 of the housing base plate 81. The gear assembly housing 16 in this application does not consist of two symmetrical hemispherical shells 62, 63 but of base plate 81 with side walls 86 and a cover which is not specified in more detail. Additionally the pole housing 18 in this embodiment has additional radial attachment plates 88 in order to attach the electromotor 10 to the attachment flange 14 in an embodiment without a gear assembly. The attachment plates 88 have, therefore, receptacles 90 for fasteners, such as screws or rivets, with which the electromotor can be connected to the attachment flange 14. Depending upon customer demand, the attachment flange 14 is produced for example from steel or plastic and represents a customer specific mechanical interface with the regulating device. The attachment plates 88 are for example likewise formed as one piece with the shell 20 or the bearing cover 26 of the pole housing 18. In order to accommodate the insertion of the radial molding 42 into the guide track 54 of the gear assembly housing 16, the attachment plates 88 preferably are arranged axially displaced to the radial moldings 42. Then in combination with the gear assembly housing 16, they would lie outside of it. In developing the radial moldings with the opposing bridges 82, the radial molding 42 between the bridges 82 likewise has recesses 76, in which projecting material 78 of the gear assembly housing base plate 81 meshes in order to prevent the electromotor 10 from turning.

The electromotor according to FIG. 6 has a kind of bayonet fastener as a mechanical interface with the connection the gear assembly housing 16 or the attachment flange 14. In this case the radial molding 42 is not designed as a rotating collar but as bayonet bridges 92 which are arranged along the circumference with gaps to each other. These bayonet bridges 92 can engage with a ring-like, unbroken guide track of the gear assembly housing 16 or the attachment flange 14. In order to accomplish this, the electromotor 10 must first be axially pushed into the corresponding interface and then turned in a certain angle as determined by the kind of bayonet connection and optionally meshed in the track. In making such a connection, the housing 16 and likewise the attachment flange 14 need not have at least two radially connectable hemispherical shells, but can be shaped as desired as a bayonet connection. The radial molding 42 is shown here as formed to a bearing cover 26 which has been designed as one piece with the shell 20. It can, however, alternately be formed to the other end, which is sealed with a separate bearing cover 28 when put together with the electromotor. In so doing, the shell 20 has bendable attachment plates 94 which are formed around corresponding projections of the bearing cover 28. The armature spindle 32 extends for the most part over the length of the pole housing 18, so that for the purpose of power transfer a coupling element 96 (for example a flex spindle) passes through the opening 40 in the bearing cover and engages an internal polyhedron head 98 (for example a square head 98) of the armature spindle 32. Such a torque tap is optionally possible on one or both sides 22, 24 of the pole housing. Between the bearings 30 and the armature 33 starting washers 100 preferably from plastic are arranged. These then axially support the armature spindle 32 on the bearings 30. The starting washers 100 rotate in a stable connection with the spindle or respectively with any armature components 102 arranged on it. These would include for example a receptacle casing 102 for a ring magnet 104.

It is to be noted, that in regard to the examples of embodiment in the figures and descriptions, numerous combinations of the individual characteristics are possible with each other. For example, the concrete configuration of the radial molding 42 and likewise its arrangement on the pole housing 18 can be varied as desired in accordance with the manufacturing process. Likewise the recesses 76 can be shaped as desired for the combination with a gear assembly housing 16 as well as with an attachment flange as long as a positive locking fit is achieved with the meshing material 78 in order to secure the electromotor 10 from turning. Correspondingly the guide track 54, respectively the fasteners 70 of the attachment flange 14, may be modified, so that their material always engages a back cut, which is formed by the axial molding in connection with the axially adjoining area 46. The embodiment of the armature 33, of the gear assembly housing 16 and of the gear assembly can thus correspond as desired to the familiar applications. The uniqueness of the invention consists therefore, in that an identical motor 10 is used as a basic motor 10 for a standard unit type concept in combination with different gear assembly housings 16 or attachment flanges 14 without requiring the use of separate fasteners to make the connection to a complementing housing. The electromotor according to the invention, respectively the gear assembly drive-unit, preferably is employed for power seat regulating devices in the motor vehicle. It can, however, be used for other regulating (positioning) drives.

The invention claimed is:

1. An electromotor for regulating a drive in a motor vehicle, comprising:
   an armature spindle mounted in a pole housing, wherein the pole housing comprises a shell, and wherein at least on one front side of the shell a bearing cover is coupled thereon to accommodate an armature spindle bearing; and
   a radial molding formed on the pole housing that receives a guide track of a gear assembly housing via radial insertion to fasten the electromotor to the gear assembly housing;
   wherein the bearing cover is formed as one piece with the shell of the pole housing and comprises an axial central peg that tapers inwardly extending in a direction from the radial molding towards the gear assembly housing when the electromotor is fastened to the gear assembly housing.

2. An electromotor according to claim 1, wherein the radial molding is formed on the bearing cover or on the shell of the pole housing.

3. An electromotor according to claim 1, wherein the bearing cover has a central opening through which the armature spindle or a gear assembly shaft that meshes with the spindle engages.

4. An electromotor according to claim 1, wherein the radial molding is formed as a rotating collar.

5. An electromotor according to claim 1, wherein the radial molding is formed as a folded double sheet metal.

6. An electromotor according to claim 1, wherein the radial molding has an outside diameter smaller than an outside diameter of the pole housing shell.

7. An electromotor according to claim 1, wherein the electromotor is secured from turning by recesses designed on the radial molding, in which material of the gear assembly housing or of an attachment flange meshes.

8. An electromotor according to claim 1, wherein the radial molding is formed as radially opposing bridges.

9. An electromotor according to claim 1, wherein the pole housing shell is double walled in the embodiment.

10. An electromotor according to claim 1, wherein the bearing cover has an axial centering peg to engage a corresponding counter formation of the gear assembly housing or an attachment flange.

11. An electromotor according to claim 1, wherein in addition to the radial molding, axially displaced radial attachment plates are formed on the pole housing and having receptacles for fasteners, with which the electromotor can be attached to the attachment flange.

12. An electromotor according to claim 1, having an attachment flange which has receptacles for fasteners for the purpose of mounting it on a motor vehicle part, wherein a centering peg is centered into a counter receptacle of an attachment flange, and the electromotor is attached to the attachment flange by means of fasteners which encompass an axial molding.

13. An electromotor for regulating a drive in a motor vehicle, comprising:
   an armature spindle mounted in a pole housing, wherein the pole housing comprises a shell, and wherein on a first front side of the shell a first bearing cover is formed as one piece with the shell and arranged to accommodate an armature spindle bearing, and on a second side of the shell a second bearing cover is positioned thereon; and
   a radial molding formed on the pole housing that receives a guide track of a gear assembly housing via radial insertion to fasten the electromotor to the gear assembly housing, wherein an outside diameter of the radial molding is larger than areas of the first bearing cover immediately adjacent in an axial direction.

* * * * *

UNITED STATES PATENT AND TRADEMARK OFFICE
CERTIFICATE OF CORRECTION

| | | |
|---|---|---|
| PATENT NO. | : 7,847,449 B2 | Page 1 of 1 |
| APPLICATION NO. | : 11/579517 | |
| DATED | : December 7, 2010 | |
| INVENTOR(S) | : Oberle et al. | |

It is certified that error appears in the above-identified patent and that said Letters Patent is hereby corrected as shown below:

Title Page; item (56);
    Page 2, Foreign Patent Documents: delete duplicate reference with incorrect date
"DE    30 36 865 A1    9/1980"

Page 2, Foreign Patent Documents: delete duplicate reference with incorrect date
"DE    861944    1/1985"

Signed and Sealed this
Second Day of August, 2011

David J. Kappos
*Director of the United States Patent and Trademark Office*